Nov. 5, 1957 W. E. GRACE 2,812,193
LANDING GEAR FOR TRAILER TRUCKS
Filed July 16, 1956 2 Sheets-Sheet 1

WILLIAM E. GRACE
INVENTOR.

BY *Herbert J. Brown*

ATTORNEY

Nov. 5, 1957  W. E. GRACE  2,812,193
LANDING GEAR FOR TRAILER TRUCKS
Filed July 16, 1956  2 Sheets-Sheet 2

WILLIAM E. GRACE
INVENTOR.

BY *Herbert J. Brown*

ATTORNEY

United States Patent Office 2,812,193
Patented Nov. 5, 1957

2,812,193

LANDING GEAR FOR TRAILER TRUCKS

William E. Grace, Fort Worth, Tex.

Application July 16, 1956, Serial No. 597,972

4 Claims. (Cl. 280—150.5)

This invention relates to heavy duty towed vehicles such as highway trailers as used in truck-trailer combinations in which the forward trailer end is usually supported solely by the fifth wheel element of the truck unit.

The primary object of this invention is to provide an improved load carrying caster wheel unit for use on highway trailers which is reliable and durable in operation and which may be selectively adjusted to accommodate various payloads of the trailer.

A second object is to provide a pair of dual caster wheel units which are rigidly tied together by a unique structure to prevent shimmy and any other undesired turning movement of one caster wheel unit independent of the other caster wheel unit.

A third object is to provide a caster wheel unit which may be engaged or disengaged from its operative position and may be adjusted for various loads or heights while the trailer is coupled to the tractor or when it is in its uncoupled position, and in this latter position the caster wheel unit acts as a dolly to guide and support the front ent of the trailer.

Another object is to provide a caster wheel unit of the type described which includes a compressed air chamber which acts as a compression spring to absorb shock loads, and in which the chamber pressure is remotely controllable from the tractor cab.

And another object is to provide a compressed air system as described which functions jointly with a hydraulic lifting and lowering system whereby the parking load may be supported entirely by the hydraulic pressure.

And yet another object is to provide a caster wheel unit employing a lever or knee action mechanism which uses a pneumatically loaded piston for increasing the operating range to accommodate dips and variations in the roadway beyond the range permissible in a direct acting structure.

A still further object is to provide spaced pairs of caster wheel units at each side of the front of a vehicle trialer wherein the units are interconected by geared shafting so that momentary undesired swiveling is resisted by both units, and yet where the units move in unison when the vehicle is turning.

And another object is to provide a caster wheel unit of this type which is free to rotate through any sector of a full 360° of horizontal travel when turning or backing.

And still another object is to provide a unique structure for a caster wheel unit by which fluid braking of the caster wheel units may be coordinated with the main vehicle wheels.

The co-rotating dual wheels in a rigid axle housing avoid many of the difficulties encountered in separately mounted trunnion axles, and by virtue of this structure together with the objects named this improved dual wheel caster arrangement will permit the trailing vehicle to have a single structure to act as a dolly when the trailer is detached from the truck and will provide an additional axle for an increased pay load.

These and other objects of this invention will be seen by an examination of the following specification and drawings in which.

Figure 2:
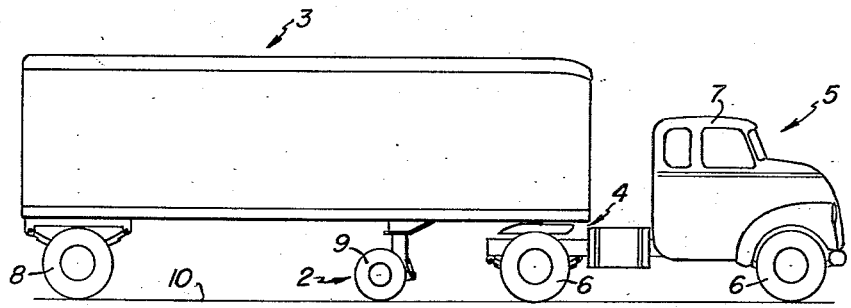
Figure 2 is a side elevational view of a truck-trailer vehicle upon which this invention is installed.

Referring now more particularly to the characters of reference in the figures, it will be observed in Figure 2 that the dual wheel caster arrangement, indicated generally at 2 is attached near the front end of a wheeled trailer vehicle 3, which is itself attached through a fifth wheel assembly 4 to a conventional truck 5 having wheels 6 and an operator's cab 7. In Figure 2, the rear wheels 8 of trailer 3, caster wheels 9 and wheels 6 are simultaneously engaging the ground 10, and consequently any pay load in trailer 3 will be distributed over the four axles of the wheels named. This is a necessary feature when the truck-trailer is operating in States which have a maximum axle load limit since it will permit an increased pay load to be carried.

Figure 3:
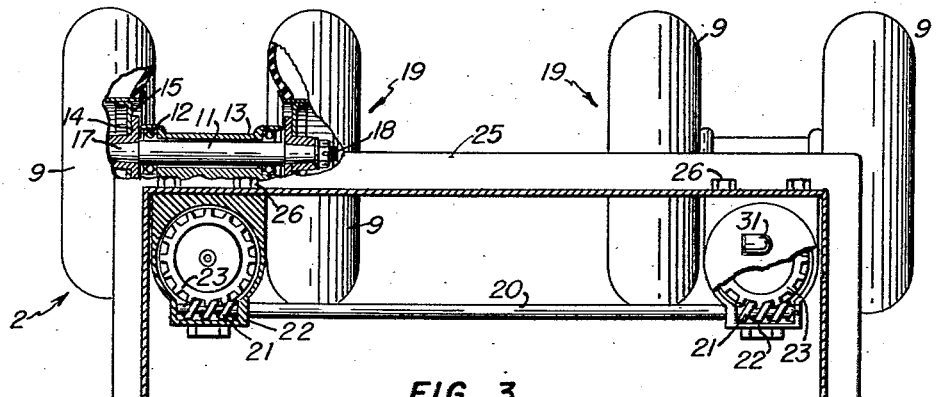
Figure 3 is a fragmentary top plan view partially in cross section of the front end mounted caster wheel units shown in Figure 2.

Examining the dual caster wheel arrangement 2 in more detail in the plan view of Figure 3, it is seen that wheels 9 are both rigidly attached to a short length axle 11 which is journalled in bearings 12 of axle housing 13, and axle mounting plates 14 are rigidly attached to the wheel plates 15 by way of matching bolt circles 16. Axle 11 is tapered as at 17 at each end to engage a corresponding internal taper of axle mounting plate 14 prior to rigidly connecting the axle and plate by means of fastener 18. Due to the preceding structure it will be apparent that the two wheels 9 of each caster unit 19 will be co-rotating to provide advantages heretofore pointed out. The two separate caster units 19 and 19' are located at opposite sides of the trailer 3 and are interconnected by a rigid shaft 20 having worm pinions 21 at each end within housing 22 which are in mesh with gears 23 which are in turn rigid with the caster wheel units swivel cylinder 24 (Figure 1) so that any unwanted swivelling of one unit 19 will be resisted by the friction of the unit 19' and the resistance through the worm gear connection, as well as the ground resistance. However, in desired swivelling, such as turning corners when an equal force is applied to each caster wheel unit, the worm gear connection will insure simultaneous and equal movement.

Figure 1:
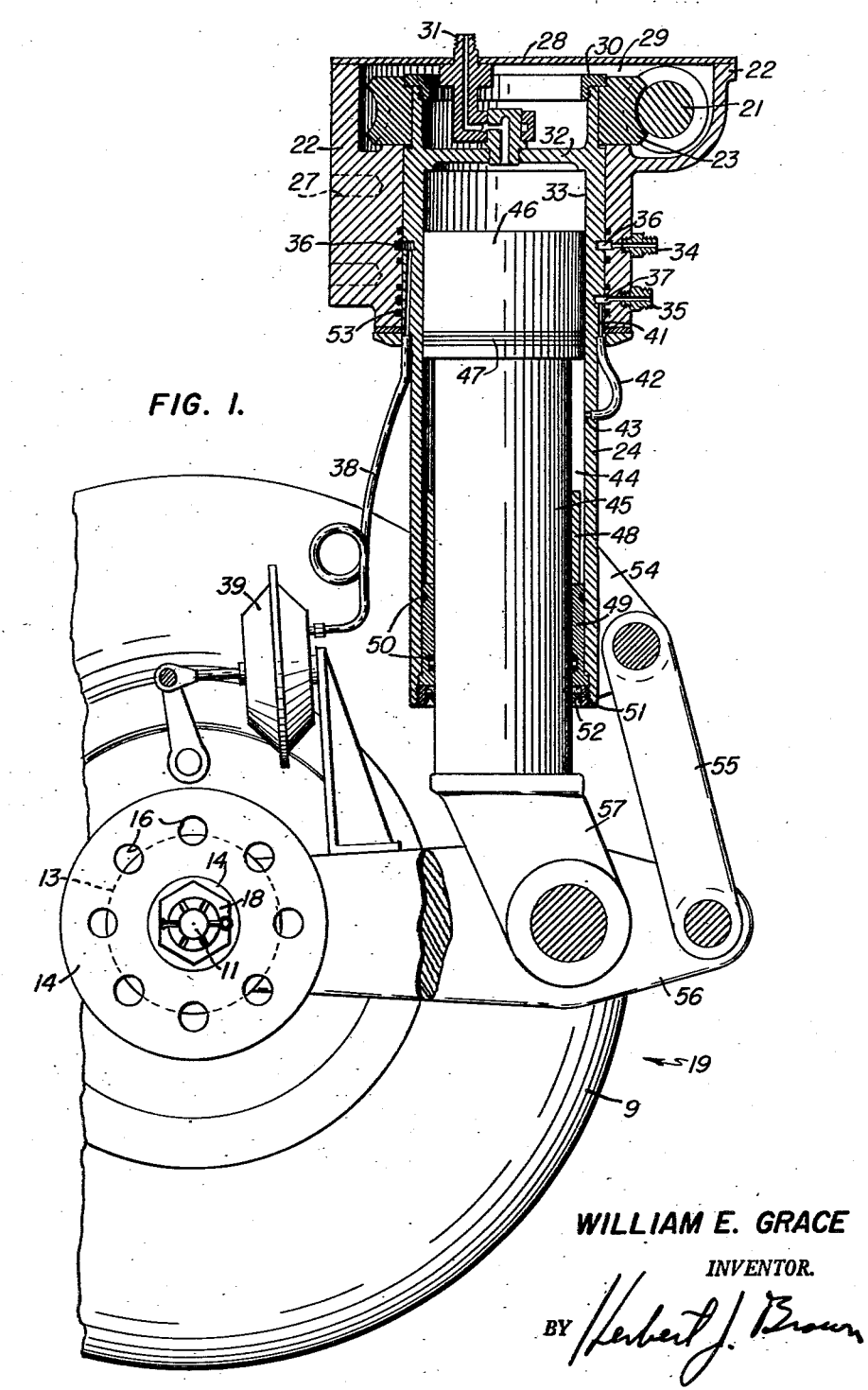
Figure 1 is a cross sectional elevational view of one caster wheel unit taken along the lines 1—1 of Figure 4.

Figure 1 illustrates the unique structure of a single caster wheel unit which permits the caster wheels 9 to be raised or lowered and permits them to absorb substantial shock loads; and also shows the method of tying in the caster wheel braking system with the master braking system (not shown); and shows details of the worm gear attachment. The caster wheel mounting frame 25 (Figure 3) supports housing 22 by means of bolts 26 engaging threaded holes 27. Housing 22 is sealed at its top by plate 28 and the recess 29 thus formed is sufficient to receive gear 23 which is splined onto swivel cylinder 24 and worm 21 which is turned or otherwise attached on shaft 20. A retainer 30 threadedly engages cylinder 24 in such a manner as to lock gear 23 thereon and yet permit swivel conector 31 to project therethrough to an engagement with top 32 of air chamber 33. Housing 22 includes a pair of fittings 34 and 35 which connect to ring grooves 36 and 37 respectively. Fitting 34 and groove 36 are connected with the master braking system of the trailer 3 and direct pressurized air to a flexible line 38 to selectively operate brake cylinder 39 which in turn operates the conventional wheel brakes (not shown). Fitting 35 is connected by fluid line 40 to the hydraulic system shown schematically in Figure 5 and referred to at this point only in reference. Ring groove 37 is connected by channel 41 to a line 42 which connects with port 43 of fluid chamber 44. Piston 45 extends through chamber 44 and into chamber 33 and is normally suspended in the chambers by a balance of loads and fluid pressures. Piston 45 includes an enlarged head 46 which may include the conventional piston rings 47 to insure a fluid tight seal against the inner bore of cylinder 24. Spacer 48 near the lower end of piston 45 abuts the top surface of bearing 49 and consequently determines the lowermost position to which piston 45 can move. Bearing 49 may be bronze and includes inner and outer O ring grooves 50 to seal the fluid in chamber 44; retainer ring 51 holds bearing 49 in place in cylinder 24 and retains an oil wiper 52. Between cylinder 24 and housing 22 are a series of O ring grooves 53 which provide a means of sealing and separating the separate fluids introduced by fittings 34 and 35, and yet permit relative rotary movement between cylinder 24 and housing 22 as when wheel units 19 swivel in turning. Housing 24 includes a bracket 54 to which is pivoted a link 55 which in turn is pivoted to horizontal lever 56 which is pivoted to bracket 57 at the lower end of piston 45 and is in turn rigidly attached to axle housing 13.

Figure 5:
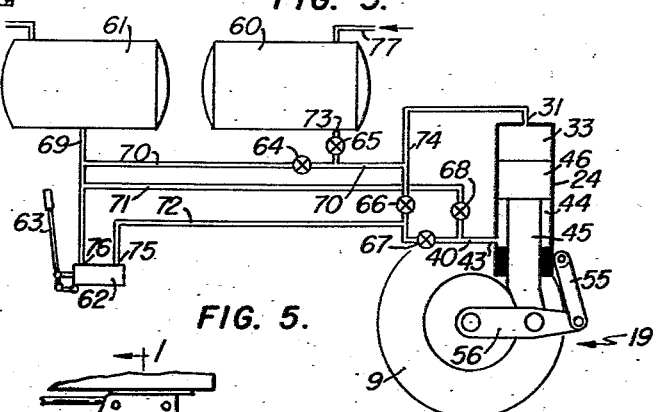
Figure 5 is a schematic view of the air and hydraulic systems employed in the dual wheel caster arrangement of this invention.
Figure 4:
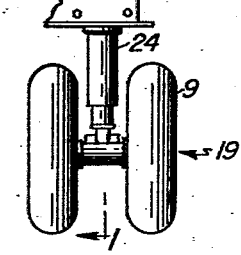
Figure 4 is a fragmentary rear elevational view of one caster wheel unit shown in Figure 3.

Referring to Figure 5 the hydro-pneumatic system which forms a part of the dual wheel caster arrangement is seen to include an air tank 60, an oil tank 61, a pump unit 62 including an operating lever 63, and strategically located valves 64—68 and interconnecting lines 69—74 through which air and/or oil is selectively channelled to and from the tanks and cylinder 24 of caster wheel units 19.

When it is desired to prepare the caster shell units for operation with a particular pay load, the proper valves 64—68 must be opened and closed in the proper sequence. Assume for the moment that all the valves are closed and the piston 45 is balanced in suspension at its fully retracted position. By opening valve 66 of Figure 5 and operating lever 63, fluid pressure will leave the pump 62 at pressure port 75 and travel through line 72, through valve 66 and through line 74 to swivel fitting 31 and into chamber 33 to apply pressure to piston head 46 and tend to move piston 45 downward. However to permit piston movement, the pressure in chamber 44 must be relieved. To do this valve 68 is opened to connect chamber 44 directly to line 71 and into line 69 whereat it can either return to oil tank 61 or to suction port 76 of oil pump 62. When the operator ceases to move lever 63, the system becomes balanced again at the new piston position. Now since air tank 60 is charged from line 77 with air at a much higher pressure than the oil now in chamber 33 the proper manipulation of valves will provide an air cushion in the top of chamber 33 to absorb road shocks. Valve 66 must not be closed to prevent introducing any more oil at this time; valve 68 remains open, valve 64 remains closed, and valve 65 is now opened to direct pressurized air from tank 60 through lines 73, 70, 74 and fitting 31 into chamber 33. As the air displaces the oil at the top of chamber 33, piston 45 will move down slightly since the oil is incompressible, and as this happens, some of the oil in chamber 44 must pass out through line 40, valve 68, line 71, line 69, and back into tank 61. At this point, valve 65 is closed sealing in the air pressure now built up in chamber 33 which acts as a shock absorber to cushion loads imposed on wheel 9 due to highway travel. Since valve 68 remains open connecting chamber 44 with the oil supply tank 61 at slightly above atmospheric pressure, piston 45 is free to move in response to road shocks and compress the air in chamber 33. This provides an effective shock absorber for the loads and forces encountered in normal highway travel.

From the foregoing description it will be readily seen that there has been produced a device as substantially fulfills the objects of the invention as set forth herein.

While this specification sets forth in detail the present and preferred construction of this invention, still in practice such deviations from such detail may be resorted to and do not form a departure from the spirit of the invention as defined in the appended claims.

What is claimed is:

1. A load carrying caster wheel unit for highway trailers, comprising a housing rigid with the trailer, a cylinder projecting downward from said housing, a ground engaging wheel below said cylinder, an axle structure for supporting said wheel, link means for connecting said axle structure and said cylinder in non-rotary relationship, a piston between said link means and said cylinder, means to introduce hydraulic fluid under pressure into said cylinder to selectively move said piston in said cylinder to vary the distance of said wheel below said housing, separate means to introduce air under pressure into said cylinder above said piston to provide a compressed air space therein to absorb road shocks imposed on said wheel.

2. A load carrying caster wheel unit for highway trailers, comprising a housing rigid with the trailer, a cylinder projecting downward from said housing, a pair of ground engaging wheels below said cylinder, an axle structure including an axle housing and an axle journalled therein, each of said wheels rigidly attached to said axle, link means for connecting said axle housing and said cylinder in non-rotary relationship, said link means rigidly attached to said axle housing, a piston between said link means and said cylinder, means to introduce hydraulic fluid under pressure into said cylinder to selectively move said piston in said cylinder to vary the distance of said wheel below said trailer housing, separate means to introduce air under pressure into said cylinder above said piston to provide a compressed air space therein to absorb road shocks imposed on said wheel.

3. A load carrying caster wheel arrangement for highway trailers including a caster wheel unit at each lateral side of the trailer, each caster wheel unit comprising a housing rigid with the trailer, a cylinder projecting downward from said housing and adapted to rotate therein, a pair of ground engaging wheels below said cylinder, an axle structure including an axle housing and an axle journalled therein, each of said wheels rigidly attached to said axle, link means for connecting said axle housing and said cylinder in non-rotary relationship, said link means rigidly connected to said trailer housing, a piston between said link means and said cylinder, means to introduce hydraulic fluid under pressure into said cylinder to selectively move said piston in said cylinder to vary the distance of said wheel below said trailer housing, separate means to introduce air under pressure into said cylinder above said piston, a gear case in said trailer housing, a gear rigidly mounted to the top of said cylinder in said gear case of each wheel unit, a second gear in each gear case in mesh with said first named gear, rigid means connecting said second gears whereby undesired momentary road movement which tends to move one caster wheel unit out of its intended direction of travel will be resisted by the ground friction of the wheels of the other said unit and whereby desired road movement such as turning will be simultaneously made by each wheel turning in unison.

4. A load carrying caster wheel unit for highway trailers which are a separable section in a truck-trailer combination, comprising a housing rigid with the trailer, a cylinder projecting downward from said housing, a pair of ground engaging wheels below said cylinder, an axle structure including an axle housing and an axle journalled therein, each of said wheels rigidly attached to said axle, link means for connecting said axle housing and said cylinder in non-rotary relationship, said link means rigidly connected to said axle housing, a piston between said link means and said cylinder, means mounted entirely on said separable trailer section to introduce hydraulic fluid under pressure into said cylinder to selectively move said piston in said cylinder to vary the distance of said wheel below said trailer housing, separate means mounted entirely on said separable trailer section to introduce air under pressuer into said cylinder above said piston to provide a compressed air space therein to absorb road shocks imposed on said wheel, said means and separate means being capable of operation in raising and lowering said wheel and imparting air pressure thereto even when said trailer is detached from said truck-trailer combination.

References Cited in the file of this patent
UNITED STATES PATENTS

| | | |
|---|---|---|
| 2,445,134 | Curell | July 13, 1948 |
| 2,572,410 | Van Doorne | Oct. 23, 1951 |
| 2,653,021 | Levy | Sept. 22, 1953 |
| 2,707,110 | Stover | Apr. 26, 1955 |